United States Patent Office 3,459,681
Patented Aug. 5, 1969

3,459,681
CAUSTIC LEACH TREATMENT OF ALUMINA PARTICLES TO IMPROVE STRENGTH PROPERTIES
William Beveridge Innes, Upland, Calif., and Malden Ward Michael, Stamford, Conn., assignors to American Cyanamid Company, Stamford, Conn., a corporation of Maine
No Drawing. Filed Feb. 24, 1966, Ser. No. 529,649
Int. Cl. B01j 11/60
U.S. Cl. 252—466     6 Claims

ABSTRACT OF THE DISCLOSURE

An alumina base catalyst having high reforming activity and good crush strength, formed by caustic leaching of a gamma alumina base, followed by calcining.

This invention relates to catalysts typically employed in catalytic reforming. The invention more particularly is directed to alumina base for such catalysts which base is characterized by a high order of crush strength, and to the method of preparing catalysts including such an alumina base.

Catalystic reforming normally refers to a production of dehydrogenated or otherwise chemically reconstructed products of hydrocarbon substantially boiling in the gasoline range by treatment at temperatures in excess of about 500° F. (260° C.) and at elevated pressures. Catalytic reforming typically includes dehydrogenation, aromatization, cyclization, and isomerization. A typical process of catalytic reforming is one in which a light naphtha or a heavy naphtha is passed over a catalyst typically selected from Group VIII or VI metal oxide supported on alumina, at a temperature between about 850° F. and 1050° F., under a pressure of between slightly above atmospheric pressure and about 600 lbs. per sq./inch, and at a rate between normally 0.5 and 5.0 volumes of liquid oil per volume of catalyst per hour. The reforming catalysts of the type with which this invention is concerned is typically a fixed-bed catalyst. In catalysts of this nature, it is desirable that the crush strength thereof be of a high order so that the catalyst when in use will not crumble and disintegrate into powder within a short period of time as a result of the high pressures and high temperatures to which the catalysts are subjected. Also, in reactions of processes of the nature in which reforming catalysts are employed, a high order of activity of the catalysts is required. Therefore, it is not sufficient that a catalyst merely have a high order of activity, and similarly it is not sufficient that a catalyst merely have a high order of crush strength. The catalysts preferably should have both a high order of activity and a high order of crush strength.

Catalyst alumina bases vary in strength depending upon the type of alumina employed, the process of making the alumina, and the process of treating the alumina base before, during, and after impregnation with a promoter. It is well known that gamma alumina, for example, is a highly active form of alumina, but it is thermodynamically unstable and tends to revert to the stable allotropic alpha form, particularly when temperatures of from about 900° C. up to 1100° C. or more are employed. Under less severe conditions, alpha trihydrate alumina (the gamma alumina precursor) tends to hydrolize to the beta-trihydrate-precursor of the eta-form. The alpha-form of alumina is much less desirable ordinarily, in so far as activity, than the gamma form and the eta is less stable towards high temperature than gamma.

It is an object of this invention to prepare a gamma alumina catalyst base, and the catalyst derived therefrom, which gamma alumina catalyst is characterized by a high order of crush strength and activity, and which gamma alumina catalyst base is present in the final catalyst in the form of gamma alumina.

It is a further object of this invention to provide a process for forming such a gamma alumina catalyst base, and the catalyst obtained therefrom.

Other objects of this invention become apparent from the above and following disclosure.

The objects of this invention are obtained by the employment of gamma alumina as a starting material, drying the gamma material, if it is not already substantially dry, calcining the dry gamma alumina, if it has not already been calcined, and treating the calcined gamma alumina with a caustic leach in an amount and for a period of time sufficient to obtain the objects of this invention, washing the leached gamma alumina until substantially all of the undesirable cations are removed, drying the gamma alumina, and calcining the dried-leached and washed gamma-alumina base. Thereafter, the alumina base is impregnated with an appropriate promoter such as platinum or molybdenum, as the case may be, followed by drying, and calcining. The preferred catalyst of this invention employs a platinum promoter obtained by impregnation with an aqueous solution of chloroplatinic acid ($H_2PtCl_6$). Also, the preferred embodiment of this invention includes first wetting the calcined gamma alumina, drying and recalcining prior to the caustic leach. Also a preferred embodiment of this invention includes a method of producing the alumina prior to the initial drying and calcining in the production of the gamma alumina. Each of these preferred embodiments serve to further increase the novel high order of crush strength obtained by the basic process of the invention.

The entire process, starting with metallic aluminum, and proceeding to the impregnation gamma alumina base, may be summarized as follows.

The above referred-to preferred process of making the gamma alumina is a variation on the alumina sol process which has long been employed in the preparation of catalyst base materials, particularly for the reforming of petroleum feed stocks. These alumina sols are normally prepared reacting metallic alumina and a weak organic acid, such as acetic acid or formic acid, in the presence of a mercury catalyst, reacting sufficiently to form a salt of alpha aluminum hydroxide complex of acetic acid. Such processes are well known to those skilled in the art and are described in such issued patents as U.S. Patents Nos. 2,345,600, 2,371,237, Re. 222,196, 2,408,024, and 2,408,724. In these processes, alpha aluminum salt is prepared by dissolving metallic alumina in a dilute (about 1–6%) organic acid in the presence of a mercury compound. The aluminum and mercury form an amalgam which slowly dissolves with the evolution of hydrogen to alumina salt containing mercury, undissolved aluminum, and other materials. In these processes, the sol is normally treated with sufficient ammonium hydroxide to obtain a pH of about 6.8 to 7.8. Also, in these processes, impregnation with promoter may occur either normally during the (alpha aluminum trihydrate) sol stage or subsequent to the formation of the alumina precipitate, before calcining.

In contrast to the conventional sol-processes referred to above, the preferred inventive process employs ammonia, or ammonium hydroxide, in an amount sufficient to produce a pH ranging from about pH 6–6.5. Part of the resulting alpha-sol-precipitate is dried, ground and admixed with a second poriton of the sol in sufficient amounts to provide an extrudable extrusion feed. The extrusion feed is extruded to form and extrudate of gamma alumina and/or precursor of gamma alumina, which is dried at a temperature preferably not exceeding about 220° C., and subsequently calcined at a temperature not exceeding about 850° C., whereby substantially wholly gamma alumina is obtained. The maximum drying temperature of about 220° C. is important to prevent the disintegration of the alumina as a result of vaporization of water within the pores, and also important in avoiding the conversion of the alpha aluminum trihydrate to the eta form, as discussed above. The maximum calcination temperature of about 850° C. is always critical to prevent the conversion of the gamma alumina into alpha alumina. The preferred calcination temperature normally ranges from about 537° C. (1000° F.) up to about 621° C., (1150° F.). In the absence of calcination, the catalyst tends to disintegrate when subjected to caustic leach. In a further preferred embodiment of the process discussed above, it is preferred to wet the first-calcined gamma alumina extrudate, and dry the second-calcine, immediately prior to caustic leach. It is self-apparent that the degree to which a high order of crush strength is obtained from the caustic leaching will be dependent upon the degree to which caustic leaching is carried out up to a reasonable point of leaching. Therefore, the calcined gamma alumina base material is subjected to caustic leach in an amount sufficient to obtain a high order of crush strength of this invention, followed by washing sufficiently to substantially remove the caustic, followed by drying and calcining. The caustic leaching of this invention includes the treatment with from about 0.01 mole caustic per mole alumina to about 2.0 mole caustic per mole alumina, with the preferred limits ranging from about 0.05 mole caustic per mole alumina to about 0.5 mole caustic per mole alumina.

The caustic may be a hydroxide or carbonate of any one or more of alkali metals and the alkaline earth metals, in aqueous solution.

Each of the above drying and calcining steps are limited to the temperatures already discussed. Also, it is preferred that the alumina to be caustic-treated be substantially dry at the time of treatment, so as to permit a maximum effectiveness of the leaching. After the calcination of the leached gamma alumina the gamma alumina base may be impregnated with an appropriate promoter. In one of the preferred embodiments of this invention discussed above, a high order of activity is obtained by a process of impregnation which employs chloroplatinic acid in aqueous solution in a concentration and for a period of time sufficient to impregnate the gamma alumina base with the desired amount of platinum, followed by drying, and calcining at temperatures discussed above.

The catalyst promoter agent which is employed in combination with the alumina can be one or more of the elements of Groups I–B, III, IV, V, VI, and VIII in the Periodic Table, or such an element can be used in the form of the sulfide and/or oxide. Specific examples of the catalytic agent are silica; boria; copper; silver; iron; platinum; palladium; tungsten; and/or the oxides and sulfides of chromium, molybdenum, vanadium, iron, cobalt, nickel, tungsten, etc. The amount of catalytic agent present in the catalyst will vary depending upon the particular use for which the catalyst is intended. Generally, however, the catalytic agent comprises about 0.1 to about 40% by weight of the total catalyst. With respect to a reforming operation, it is preferred that the catalytic agent constitutes about 0.1 to about 30% by weight of the total catalyst. In this regard, preferred catalysts for hydroforming operations include, for example, the oxides and/or sulfides of the left hand elements of Group VI, e.g. molybdenum and chromium, as well as platinum and/or palladium on alumina.

In regard to the preferred platinum catalyst of this invention, it should be noted that platinum catalysts in general are used by the petroleum industry to upgrade virgin naphthas for the production of motor fuels and for the production of aromatic hydrocarbons. A usually preferred naphtha is a 200° F.–450° F. cut of a Mid-Continent crude. Also naphthas from other crudes such as Texas, California, or Kuwait may be used. Mid-Continent crudes are quite plentiful, and contain a large amount of naphthenes, as for example, about 40%. These naphthenes are convertible to corresponding aromatics by dehydrogenation under reforming conditions. Other reactions which normally take place in reforming are hydrocracking of paraffins, isomerization of paraffins, and dehydrocyclization of paraffins to aromatics. In a typical reforming run, a Mid-Continent crude naphtha having an unleaded Research octane rating of 35–40 units is converted to a motor fuel which has an octane rating of 85–100 units.

It should be noted that although the preferred inventive process employs "extruding" to obtain an extrudate, it is within the scope of this invention to form other types of catalysts, typical catalyst forms including pills, pellets, or beads. Aluminum sol is a recognized precursor for such catalysts in that catalysts made from the sol have demonstrated excellent performance in the regenerative Ultraforming process.

It should be noted that the catalyst of this invention, and the processes obtaining the catalyst of this invention, apply solely to a gamma type alumina such as obtained by the above described processes. Processes such as precipitation methods by the employment of strong acids, and other conventional processes of producing alumina, do not produce an alumina which can be emplyed for purposes of this invention. The caustic leaching of such catalyst produces no apparent significant increase in the crush strength.

Prior to this invention, activity was increased solely by acid leaching. The catalyst of this invention obtained by caustic leaching is characterized by a high activity as well as by high crush strength which is superior to the crush strength obtained by a typical acid leach.

The following examples illustrate the preparation of the catalyst of this invention, as well as illustrating a typical acid leach. Table I illustrates the comparative crush strength before and after leach employing caustic leaches of various concentration, in comparison to a typical acid leach. The following examples should not be construed as limiting this invention except insofar as limited in the appended claims.

EXAMPLE I

Gamma alumina pellets are mixed with caustic solution (about 1 mole sodium hydroxide (NaOH) per mole of alumina ($Al_2O_3$)), the temperature of the mixture obtains a temperature of about 50° C. After about 1 hour, the solution is removed from the pellets, and the pellets are washed with water to remove sodium. To more thoroughly remove sodium, the pellets are additionally acid-washed at a conventional acid concentration such as about 0.5% to about 3%. The pellets are dried at a temperature below about 220° C., and are calcined at a temperature below about 850° C., the calcining being at about (1100° F.).

The crush strength of the fresh particulate catalyst is measured by applying a measurable, streadily increasing force to a single particle, which is held between two flat parallel plates, and noting the point where the particle fails (breaks). The procedure is repeated for a number of particles, and the "crush strength" of the material is reported as the average crushing force required. When the crushing force is applied through an air cylinder with a one-square inch piston, the crushing force is read directly from a suitably connected pressure gauge (p.s.i.). The crush strength of the catalyst both before leach and after leach is disclosed in table below.

It should be noted, that the caustic leach in this example employed one mole of sodium hydroxide to one mole of alumina.

EXAMPLE II

The procedure of Example I is repeated, except that sodium hydroxide is employed in an amount of 0.5 mole of sodium hydroxide per mole of alumina. The crush strength both before leach and after leach is illustrated in table below.

EXAMPLE III

The procedure of Example I is repeated except that sodium hydroxide is employed in an amount of 0.1 mole per mole of alumina. The crush strength both before leach and after leach is illustrated in table below.

EXAMPLE IV

The procedure of Example I is repeated except that a typical acid leach of 1 mole of acid is employed for an equivalent molar amount of alumina. The crush strength before leach and after leach is illustrated in table below.

TABLE

| Example | MNaOH/M Al$_2$O$_3$ | Crush strength Before leach | Crush strength After leach | Percent Al$_2$O$_3$ lost |
|---|---|---|---|---|
| I | 1.0 | 6.7 | 14 | 15 |
| II | 0.5 | 6.7 | 15.6 | 12.5 |
| III | 0.1 | 6.7 | 25.5 | 2.0 |
| IV | (¹) | 9.8 | 9.1 | 10.0 |

¹ Typical acid leach of 1 M/M Al$_2$O$_3$.

From the above table it is seen that crush strength after caustic leaching is substantially increased. It is also seen that the degree of crush strength imparted to the catalyst base being leached is indirectly proportional to the concentration of the caustic employed in the caustic leaching. It is also seen that the crush strength after acid leaching remains substantially the same as before leaching and that the crush strength after acid leaching is substantially less than the crush strength obtained by the caustic leaching of this invention. Also it is seen that the alumina loss of Example III is much less than the acid leach loss of Example IV.

EXAMPLE V

The procedure of Example I is repeated employing ammonium hydroxide and substitution for sodium hydroxide. No significant improvement in crush strength is obtained.

EXAMPLE VI

The procedure of Example I is repeated employing an alumina containing little or no gamma alumina, the substitution for the gamma alumina of Example I. No significant improvement in crush strength was obtained. Other suitable changes and variations may be made in carrying out the invention as described herein without departing from the spirit and scope thereof as defined in the appended claims.

We claim:
1. A process for producing a catalyst characterized by a gamma alumina base having a high order of crush strength comprising subjecting a first-calcined gamma alumina to a leach in an amount of from about 0.01 to 2 mols caustic agent per mol of alumina, with a caustic agent selected from the group consisting of alkali and alkaline earth metal hydroxides and carbonates to impart a high order of crush strength, washing said leached gamma alumina, and drying and post-calcining said washed gamma alumina.

2. A process according to claim 1, in which said calcining employs temperatures up to about 850° C.

3. A process according to claim 2, including water-wetting the first-calcined gamma alumina, drying, and pre-calcining at a temperature up to about 850° C. prior to said caustic leaching.

4. A process according to claim 2 comprising impregnating said causic-leached, dried and post-calcined gamma alumina base with a promoter comprising applying thereto an impregnating and effective amount of an aqueous solution of chloroplatinic acid, drying and re-calcining at a temperature up to about 850° C., and said caustic comprising sodium hydroxide at about 0.05 to about 0.5 mole sodium hydroxide per mole of acid gamma alumina.

5. A process according to claim 1, in which said gamma alumina is first produced by a process comprising admixing metallic aluminum and a weak acid in the presence of a catalytic amount of mercury, in amounts sufficiently to form an alumina sol, treating a portion of said sol with ammonia in an amount sufficiently to obtain a pH ranging from about pH 6 up to about pH 6.5 and sufficiently to obtain a precursor-precipitate of gamma alumina, drying said precipitated alumina, particulating said dried precipitated alumina, admixing with said particulate alumina a second portion of said alumina sol, extruding said mixture, drying the extrudate-precursor of gamma alumina at a temperature up to about 220° C. and calcining at a temperature of from about 550° C. up to about 850° C., said drying and calcining being at temperatures jointly sufficient to form gamma alumina, leaching said gamma alumina extrudate with caustic, washing, drying, and calcining according to the process of claim 1.

6. A composition obtained by a process according to claim 1.

References Cited

UNITED STATES PATENTS

| 2,773,011 | 12/1956 | Haensel | 252—466 |
| 2,806,004 | 9/1957 | Milliken | 252—466 |
| 2,818,393 | 12/1957 | Lefrancois et al. | 252—466 |
| 2,939,848 | 6/1960 | Malo | 252—463 |
| 2,971,928 | 2/1961 | Brennan et al. | 252—466 |
| 3,038,865 | 6/1962 | Abrahams | 252—466 |
| 3,271,325 | 9/1966 | Davies et al. | 252—466 |
| 3,280,041 | 10/1966 | Michael | 252—466 |
| 3,291,564 | 12/1966 | Kearby | 252—463 |

OTHER REFERENCES

The Condensed Chemical Dictionary, sixth edition, p. 230, Reinhold Publishing Corp. (New York).

DANIEL E. WYMAN, Primary Examiner

P. E. KONOPKA, Assistant Examiner

U.S. Cl. X.R.

23—143; 208—138; 252—463

UNITED STATES PATENT OFFICE
CERTIFICATE OF CORRECTION

Patent No. 3,459,681                                            August 5, 1969

William Beveridge Innes et al.

It is certified that error appears in the above identified patent and that said Letters Patent are hereby corrected as shown below:

Column 4, line 59, after "about", second occurrence, insert -- 593° C. --.

Signed and sealed this 25th day of August 1970.

(SEAL)
Attest:

Edward M. Fletcher, Jr.                               WILLIAM E. SCHUYLER, J.
Attesting Officer                                            Commissioner of Patent